United States Patent

Kyser

[15] 3,678,259

[45] July 18, 1972

[54] ASYNCHRONOUS LOGIC FOR DETERMINING NUMBER OF LEADING ZEROS IN A DIGITAL WORD

[72] Inventor: Leslie T. Kyser, Binghamton, N.Y.

[73] Assignee: The Singer Company, New York, N.Y.

[22] Filed: July 28, 1970

[21] Appl. No.: 58,862

[52] U.S. Cl. ....................235/156, 235/164

[51] Int. Cl. ....................G06f 7/38

[58] Field of Search ....................235/156, 164, 159, 160, 168

[56] References Cited

UNITED STATES PATENTS

| | | | |
|---|---|---|---|
| 3,043,509 | 7/1962 | Brown et al. | 235/156 |
| 3,193,669 | 7/1965 | Voltin | 235/164 |
| 3,234,368 | 2/1968 | Kregness | 235/159 |

OTHER PUBLICATIONS

C. V. Freiman, "Normalized Integer Operations for a Fl. Pt. Arith. Unit," IBM Tech. Disclosure Bulletin, Vol. 9 No. 7. Dec. 1966 pp. 850–851.

*Primary Examiner*—Eugene G. Botz
*Assistant Examiner*—David H. Malzahn
*Attorney*—Francis L. Masselle, William Grobman and Charles S. McGuire

[57] ABSTRACT

This invention relates to an asynchronous device for counting the number of consecutive leading zeros, starting with the most significant digit, in a digital word. Such a device is useful in generating shift and exponent modification information in floating-point digital computers and in generating information for overflow detection in fixed-point digital computers. The device comprises a plurality of gates, one for each digit in the binary word, which are so interconnected that they pass information only when the particular digit signal applied thereto is a zero and only when all of the higher order (more significant) digits are also zeros. The outputs of the gates are applied to a plurality of adders where they are counted, and the total is presented at the output. The total can than be used to control a shifter for properly locating the binary point in the word, and to provide information for exponent modification, or to provide information for overflow detection.

4 Claims, 1 Drawing Figure

PATENTED JUL 18 1972 3,678,259
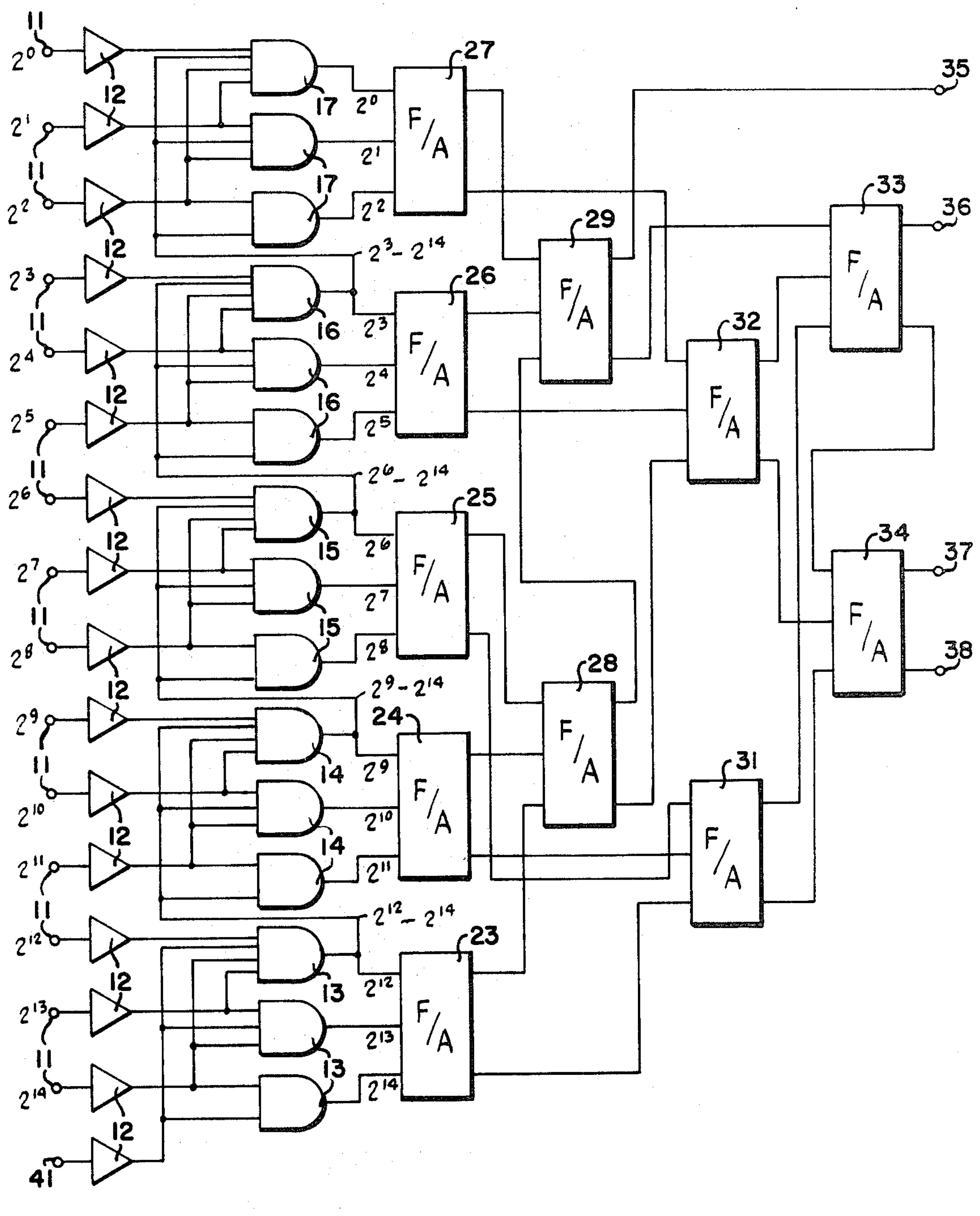
INVENTOR.
LESLIE T. KYSER
BY
William Grobman

ASYNCHRONOUS LOGIC FOR DETERMINING NUMBER OF LEADING ZEROS IN A DIGITAL WORD

This invention relates to digital computers, and, in particular, to devices useful in floating-point computers.

Floating-point computers are becoming more popular because they are more versatile, and they relieve programmers of a variety of bookkeeping chores. For this purpose, a floating-point computer is one which can accept numerical information in which the point (binary, quinary, decimal, etc.) is located anywhere in the input word. However, in order to preserve accuracy and information pertaining to orders of magnitude, each floating-point operation involves normalization of the floating-point result. Each number word can be considered as being formed of two factors or parts: a number or fraction part and an exponent or power part. Normalizing is the process or step of shifting the numerical part of each word so that the zeros occupying the most significant digit positions in the fractional part are eliminated and the exponent is adjusted to maintain the original value. This can be accomplished by counting the number of zeros which appear to the left of the most significant nonzero digit, and then left shifting the fractional part of the word that number of places and reducing the current value of the exponent accordingly. This ensures that the most significant digit position of the fraction part will always be occupied by a digit other than zero. Although the principle of operation has been well known for a long time, there is still a need for simple fast and effective apparatus which will count the number of leading zeros in the most significant digit positions of a word, and will do this for all words which represent any possible quantity within the limits of the machine. The device of this invention provides such a device.

It is an object of this invention to provide a new and improved digital device.

It is another object of this invention to provide a new and improved device for handling digital information.

It is a further object of this invention to provide a new and improved device which is useful in floating-point computers.

It is still another object of this invention to provide a new and improved device for determining the number of consecutive leading zeros in the most significant digit positions of a digital word.

It is still a further object of this invention to provide a new and improved electronic device which operates asynchronously and at high speed to count leading zeros in digital words.

Other objects and advantages of this invention will become more apparent as the following description proceeds, which description should be considered together with the accompanying drawings in which the single figure is a logical block diagram of the device of this invention.

Referring to the drawing in detail, assuming for this discussion that the apparatus shown is designed to handle digital words of 15 digits each, the reference character 11 designates a plurality (15) of input terminals to which the information word is applied. A control signal is applied to a terminal 41, and with the input terminals 11, is connected to the inputs of inverters 12 which are connected to the inputs of a plurality (15) of AND gates 13, 14, 15, 16, and 17, with the most significant digit input terminal 11 and terminal 41 being connected to three gates 13, the next most significant digit input 11 being connected to two of the three gates 13, and the third most significant input terminal 11 being connected to one of the three gates 13. In this manner, the terminals 11 and the gates are operatively divided into groups of three, designated 13, 14, 15, 16, and 17, with each group being connected as mentioned. The control terminal 41 is added to the first group of three. The outputs of the three gates in each of the groups 13–17 of three are connected to the three inputs of one of the adders 23, 24, 25, 26, or 27. In addition, the output from the gate 13, whose input includes the least significant digit in the group of three, is connected to the inputs of each of the three gates 14 in the next group of gates. Each of the adders 23–27 has three inputs and a sum and a carry output, with the output of the gates 13 connected to adder 23, gates 14 connected to adder 24, gates 15 connected to adder 25, gates 16 connected to adder 26, and gates 17 connected to adder 27. In the figure, the adders are shown with the inputs at the left and their outputs at the right and with the sum output to the top and the carry output to the bottom. The sum outputs of the adders 23, 24, and 25 are applied as inputs to an adder 28 which has a sum and a carry output, and the sum outputs of the adders 26, 27, and 28 are applied to the inputs of an adder 29 which has a sum and a carry output. The sum output of the adder 29 is applied to an output terminal 35. The carry outputs of the adders 23, 24, and 25 are applied as inputs to an adder 31 which has a sum and a carry output, and the carry outputs of the adders 26, 27, and 28 are applied as inputs to an adder 32 which has a sum and a carry output. The sum outputs of the adders 31 and 32 and the carry outuput of the adder 29 are applied as inputs to an adder 33 which has a sum output and a carry output. The sum output of the adder 33 is applied to an output terminal 36. The carry outputs of the adders 31, 32, and 33 are applied as inputs to an adder 34 whose sum output is applied to an output terminal 37 and whose carry output is applied to an output terminal 38.

In operation, the device of the drawing must count the zeros which appear to the left of the first significant digit in a 15-digit word. To accomplish this, the digit word or number is applied to the 15 input terminals 11 with one digit applied to each terminal, and with the most significant digit to the bottom. The terminals 11 are connected to the inputs of the 15 gates 13–17 through the inverters 12, so that when one terminal 11 has a nonzero applied to it, it is applied to the gates as a zero. The terminal 41, to the extreme bottom, has a control signal applied to it whenever the apparatus is operating. Consider the left three gates which are labeled 13. The inverted control signal is applied to the input of all of the gates 13, and so is the inverted signal from the bottom most digit terminal 11. Moving toward the top, the digit applied to the next terminal 11 is inverted and applied to the second and third gates 13, and the information applied to the third digit terminal 11 is inverted and applied only to the top most gate 13. The gates in the other groups of gates 14–17 are similarly connected to their input terminals 11 through inverters with the output of the least significant gate in any group serving as the enable signal for all of the gates in the next group. It should be understood that the terms most and least significant when applied to the gates 13–17 or to the terminals 11 are used merely to designate their relative positions and have no real numerical significance. All of the information applied to the terminals 11 have the same weight in this apparatus. The outputs from each group of gates 13, 14, 15, 16, and 17 are applied as inputs to a separate adder. As mentioned above, each of the adders 23–27 has a sum output and a carry output, and each of the sum outputs represents a single count or $2^0$, whereas each of the carry outputs represents a count of two of $2^1$.

Consider, now, the situation where the second most significant digit of the word applied to the terminals 11 is a nonzero and the control terminal 41 receives the proper signal. Looking again at only the group of three gates labelled 13, the first terminal 11 has a zero applied to it, the second has a one applied to it, and the third has a zero applied to it. The bottom gate 13 receives two ones and passes an output to the adder 23. The second gate 13 has only two out of three inputs which are ones since the one applied to the second terminal 11 is applied to the gate 13 as a zero, so that gate does not pass an output to the adder 23. The third gate 13 also receives the second zero and it does not pass an output to the adder 23. This means that the adder 23 has counted only a single one which appears as a one on the adder sum output with a zero on the adder carry output. In addition, since the output from the third gate 13 is a zero, the gates 14 in the next group of gates have their enable signal from the first group of gates 13 applied as a zero, and these gates 14 do not pass outputs to the adder 24. This zero is passed to the gates 15, 16, and 17 in the rest of the groups, and the end result is that a single count is recorded only at the output terminal 35, even though other digits in the word are zeros. This means that the first significant digit is in the second most significant position of the word, and that the word need be shifted only one place to put the first nonzero digit in the most significant position.

The adders 23-27 all receive as inputs the outputs from the gates 13–17. Each of these adders has a sum output equal to one count and a carry output equal to two counts. In order to produce a single digital word which will represent the number of zeros to the left of the most significant digit, the outputs from the adders 23–27 are added together. The sum outputs from the adders 23, 24, and 25 are applied as inputs to an adder 28 whose sum output represents a count of one and whose carry output represents a count of two. The sum outputs from the adders 26 and 27 together with the sum output from the adder 25 are added together in an adder 29 whose sum output applied to output terminal 35 represents a count of one and is the least significant digit of the total, and whose carry output represents a count of two. The carry outputs from the adders 23, 24, and 25 are added together in an adder 31 whose sum output represents a count of two and whose carry output represents a count of four. The carry outputs from the adders 26, 27, and 28 are added together in adder 32 whose sum output represents a count of two and whose carry output represents a count of four. The carry output from the adder 29 and the sum output from the adders 31 and 32 are added together in an adder 33 whose sum output represents a count of two and whose carry output represents a count of four. The sum output of the adder 33 is the second digit of the total and is applied to the output terminal 36. The carry outputs from the adders 31, 32, and 33, each of which represents a count of four, are applied to the inputs of adder 34 where they are added together to produce a sum output which represents a count of four and is applied to terminal 37 representing the third digit of the total, and a carry output which represents a count of eight and is applied to terminal 38, representing the most significant digit of the total count.

From the above description, it can be seen that the device of this invention comprises two parts, a gating system and a counting system. The gating system includes inverters for inverting the inputs to the gates to convert each zero of the word being examined into a one when it is applied to the gates, and also means for applying each digit input to all of the gates in the lower order positions. This may be accomplished by actually applying each input digit to all of the gates, or, as it is done in this embodiment, by dividing the total number of gates into groups and passing on from one group to the next lower order group the output of the gates in the least significant position in that group. Within each group, the most significant digit input is applied to all of the gate, the next lower digit to one less gate, and so forth. In this manner, the most significant "one" inhibits the outputs of all of the gates connected to the lower order inputs, so that the total count output represents only the number of zeros to the left of that one. Each counter comprises only three inputs which are adder together, so that the total count can be achieved only by cascading adders with the same valued amounts being applied to the same adders. In this way, the adders 23–29 have as inputs information representing individual counts, the adders 31, 32, and 33 have inputs which represents counts of two, and the adder 34 has inputs which represent counts of four. The final count is represented by the signals on the terminals 35, 36, 37, and 38 where 35 represents single counts, 36 represents $2^1$, 37 represents $2^2$, and 38 represents $2^3$. The information appearing at the output terminals 35–38 can be applied to other portions of the computer to determine the number of positions the word must be shifted to the left and to determine the exponential correction which must be made so that the shifted word represents the actual value of the original word.

The above specification has described a new device for examining individual digital words to determine the number of zeros present before the most significant effective digit in the word. A particular embodiment of the invention has been shown and described as illustrative of the construction and operation of the device of this invention, but it is not intended that this invention be limited to any size word or any particular circuit components. This apparatus is useful, for example, in floating-point digital computers which accept information of any length within the range of the machine. In floating-pint machines, the information must be normalized by shifting the word to eliminate zeros to the left of the first significant digit, and the number of shifts must be determined. The apparatus of this invention provides a simple, inexpensive, and accurate system for accomplishing that. It is realized that the above description may indicate to other in the art additional ways in which this apparatus may be utilized without departing from the invention. It is, therefore, intended that this invention be limited only by the scope of the appended claims.

What is claimed is:

1. A device for counting the leading zeros in a digital word, said device comprising a plurality of gates, said plurality comprising one gate for each digit of the word to be processed, means for applying to the inputs of each of said gates all of the digits more significant than that gate, and means for summing the outputs of all of said gates to produce a single number which represents the total of the zeros in said word which occupy consecutive positions more significant than the most significant nonzero.

2. Apparatus for counting the number of leading zeros in the more significant digit positions of a digital word which precede the first nonzero digit, said apparatus comprising a gate for each digit of the word to be tested, each of said gates having more than one input and being adapted to pass a signal when all of the signals applied to all of its inputs represent ones, said gates and digits being arranged in groups, means for connecting all of the digits in a group to the inputs of the gate having least significance in the group, means for applying to the input of the gate in each group of highest significance the output from the gate of lowest significance of the group having immediate higher significance, and inversion means connected to the inputs of each gate to which the digit is to be applied.

3. The apparatus defined in claim 2 further including means for determining the number of gates which open, said determining means comprising a plurality of adders connected to the outputs from said gates to add all of the gate outputs.

4. The apparatus defined in claim 3 wherein each of said adders has at least two inputs and two outputs, means for connecting the two inputs of each adder the outputs from gates and outputs from other adders having mathematical significance of the same power, and means for connecting the outputs from the adders in the various levels to inputs of the next higher level adders to produce a final sum which represents the total number of zeros in the digital word being tested which precede the first nonzero digit.

* * * * *